June 23, 1959
R. L. KITRELL
2,892,071
WELDING APPARATUS FOR FORMING STRINGER BEADS
Filed June 4, 1958
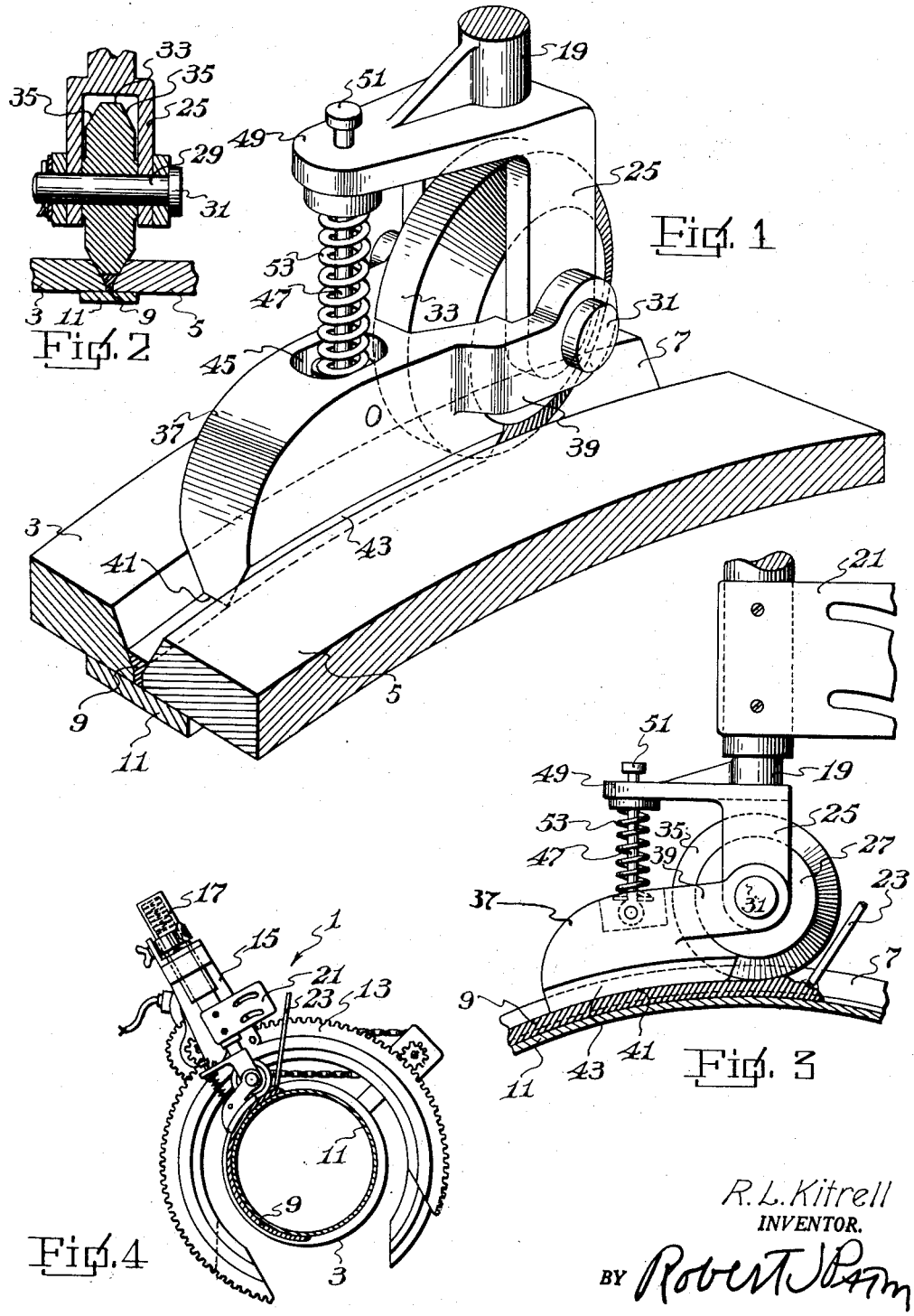
R. L. Kitrell
INVENTOR.
BY Robert J. Parm
ATTY

United States Patent Office 2,892,071
Patented June 23, 1959

2,892,071

WELDING APPARATUS FOR FORMING STRINGER BEADS

R. L. Kitrell, Tulsa, Okla.

Application June 4, 1958, Serial No. 739,734

9 Claims. (Cl. 219—125)

The present invention relates to welding apparatus, and more particularly to such apparatus adapted to form stringer beads between contiguous members prior to the deposit of the weld proper.

In the art of welding together large, heavy metal plates and pipes and the like, it is the usual practice to prepare the edges to be welded together by beveling the same so that the cross section of the joint to be welded is generally V-shaped. In this way, the weld metal is enabled to fill the joint completely and bond securely to the contiguous edges of the members to be welded together and is held in such position that it solidifies to a weld having optimum strength characteristics.

However, the provision of a joint having oppositely beveled contiguous edges also has certain disadvantages in that difficulty is encountered when it is attempted to retain within the joint the metal deposited from a consumable electrode or other welding rod. The molten weld metal tends to run through the joint between the relatively sharp opposed edges thereof and leave a weld which at least is partially deficient in weld metal and at worst is discontinuous. A common solution to the problem of loss of weld metal through the joint is the provision of backup members comprising plates or strips or rings positioned firmly against the underside of the joint to retain the molten weld metal therein until it solidifies by cooling.

Backup members are ordinarily quite satisfactory for relatively small welding jobs in which the size of the members to be welded together is not great or in which the members are relatively thin. But in larger welding jobs in which the members to be welded together are relatively large or thick, the backup members do not function adequately to maintain the weld metal in the joint and preserve a clean welded joint. Chief among the reasons for this is the fact that when larger members are welded together, or when the members to be welded together are relatively thick and the joint requires a large amount of weld metal, the thermal stresses set up in the members tend to misalign them relative to each other and relative to the backup member, with the result that no matter how carefully the backup member is initially positioned, it cannot adequately perform its intended function during the actual welding operation.

Accordingly, when welding together relatively large or heavy members, resort is often had to the use of a "stringer bead," a relatively small preliminary weld which bridges over the bottom of the joint. The stringer bead is run in against the backup member and when solidified holds the contiguous members together precisely in their proper position for the deposit of the weld proper. Thereafter, when the principal body of weld metal is applied to the joint on top of the stringer bead, the molten weld metal is retained in the joint by the stringer bead and the stringer holds the members in proper orientation against thermal deflection.

Inasmuch as a subsequent welding operation must be performed on top of the stringer bead, it is obvious that the bead must be laid down with the same care and precision that the joint is otherwise prepared for welding. If the completed stringer bead is uneven or has spattered or run over adjacent portions of the joint, the weld as finally completed will be correspondingly defective. For example, inadequacies and depressions in the stringer bead tend to cause corresponding defects in the completed weld. Also, if the stringer bead projects substantially beyond its intended contour, then localized overheating or "burning" of the weld and other weld defects may occur.

Accordingly, it is an object of the present invention to provide welding apparatus for forming stringer beads which will tightly close and securely bind the joint between contiguous members but will not fill the joint.

Another object of the present invention is the provision of apparatus for forming stringer beads which will be uniform in cross-sectional configuration throughout their length.

Another difficulty arises when it is attempted to form welds which are non-horizontal in their orientation. For example, in the assembly of great lengths of pipe such as pipe lines, it is customary to assemble the pipe line from a plurality of relatively short pipe sections laid end to end. The contiguous ends of each adjacent pair of sections are beveled and butt welded. Since the work cannot be rotated, the welding operation requires welding from literally every angle from straight down to straight overhead. It has been necessary for welders to get down into the ditch to work. Naturally, the ditches are not dug much larger than is necessary, so that the welder has been forced into dangerously close contact with his work. The difficulties and dangers of welding in such confined quarters will be especially clear when it is realized that a large proportion of each weld is overhead or vertical work, with the result that there is a good deal of dripping and spatter. In addition to the dangers involved, it will also be realized that the loss of so much metal from the weld inevitably leaves a weld which is undesirably weak. Furthermore, the irregularities in the weld introduced by such loss of weld metal set up points of galvanic action after the weld has been buried, and this results in excessive localized corrosion.

Although the problems of non-horizontal welding in general are quite serious, those of forming non-horizontal stringer beads are even more difficult to solve. The formation of a stringer bead involves the formation of only a partial weld at the bottom of a prepared joint. The stringer bead is relatively small and the loss of weld metal from the bead affects the quality of the bead even more than in the case of a weld which fills the joint. Also, the stringer bead is relatively inaccessible and relatively more difficult to retain in place until it solidifies than is a weld which fills the joint.

Therefore, it is a further object of the present invention to provide apparatus for forming stringer beads between contiguous members, which is adapted to prevent the loss of molten metal from the bead.

Finally, it is an object of the present invention to provide welding apparatus for forming stringer beads between contiguous members, which will be relatively simple and inexpensive to manufacture, easy to adjust and to operate at high speeds, and safe, rugged and durable in use.

Broadly, the present invention solves the problems of the prior art in this field by providing apparatus for forming stringer beads between contiguous members, in which a presser member having oppositely inclined beveled surfaces complementary to the beveled surfaces of the prepared joint is forced down within the joint to follow behind the welding rod to press the bead to its desired cross-sectional configuration. An elongated shoe follows behind the presser member and also extends within the joint to contact the formed bead and retain it in its desired shape until after the bead solidifies.

Other objects, features and advantages of the present invention will become apparent from a consideration of the following description, taken in connection with the accompanying drawing, in which:

Figure 1 is a fragmentary perspective view of welding apparatus for forming stringer beads, according to the present invention;

Figure 2 is a cross-sectional view through the presser member and associated structure;

Figure 3 is a fragmentary side elevational view of the structure adjacent the welding area, looking in the direction of the axis of the members being welded together; and Figure 4 is a view seen axially of a pipe line under construction and showing the device of the present invention in use but with certain parts removed for clarity.

Referring now to the drawing in greater detail, there is shown a welding apparatus indicated generally at 1 for forming stringer beads at the bottom of joints between contiguous members to be welded together such as cylindrical aligned pipe sections 3 and 5 having contiguous beveled edges 7 which are V-shaped in cross section. Between their most adjacent portions, beveled edges 7 receive and retain a stringer bead 9 which is held in place during solidification by a conventional backup ring 11.

The apparatus for forming stringer bead 9 is supported for revolution in either direction about the common axis of pipe sections 3 and 5 by means of the structure illustrated and described in copending application Serial No. 711,599 filed January 28, 1958, this structure being incorporated in the present application by reference so as to avoid useless repetition of the disclosure thereof.

There is thus provided a carriage 13 including a bracket 15 on which is adjustably mounted a cylindrical sleeve 17 within which is disposed for radial reciprocation a shaft 19 spring urged radially inwardly, all as described in the above identified copending application. A pair of flat plates 21 is secured one on either side of shaft 19 and comprises a portion of an adjustable holder for a consumable electrode 23 which is continuously fed toward the welding area during the operation of forming the stringer bead. The remainder of the electrode holder and the feeding mechanism and associated structure and the function of these parts is further described in the above identified copending application.

At the radially inner end of shaft 19 is a yoke 25 between the ends of which is rotatably disposed a presser member comprising a roller 27 rotatable on a pin 29 which passes through the radially inner ends of the arms of yoke 25 and is provided at one end with a head 31 and at the other end with a washer held in place by a cotter pin.

Roller 27 has a cylindrical outermost periphery 33 of an axial extent very substantially less than the width of roller 27 axially thereof. Periphery 33 is bounded about its two sides by a pair of oppositely disposed truncated conical beveled surfaces 35 both of which are coaxial with roller 27.

As best seen in Figure 2, beveled surfaces 35 of roller 27 are disposed at the same angle to each other as beveled edges 7; and since periphery 33 is of a width substantially less than the greatest width of the joint between edges 7 at the upper ends thereof, roller 27 will extend down into the joint and roll along in the joint. Periphery 33 and beveled surfaces 35 of roller 27 will coact with beveled edges 7 in effect to iron out irregularities in bead 9 immediately after the deposit thereof. The axis of radially inward thrust of shaft 19 intersects the axis of roller 27 at right angles; and hence, it will be clear that the thrust of shaft 19 will largely be borne by the interengaging surfaces of beveled edges 7 and beveled surfaces 35. Roller 27 and the holder for electrode 23 are in unitary assembly, and this unitary assembly has limited radial movement relative to the axis of the aligned pipe sections 3 and 5 to accommodate to irregularities in the joint so that constant electrode orientation is maintained during the welding operation.

Roller 27 is of porcelain or other ceramic, or of other relatively hard electrically non-conductive material. Thus, electrode 23, which always precedes roller 27 by only a small distance, will not be shorted should it touch the roller.

Mounted on the unitary assembly described above is an elongated shoe 37 of porcelain or other hard, electrically non-conductive material. Shoe 37 has a pair of arms 39 extending forwardly therefrom in the welding direction, which is clockwise as seen in Figure 3. Arms 39 are spaced apart and have aligned holes through their ends, the ends being disposed on either side of the legs of yoke 25. Pin 29 passes through these ends of arms 39 so that shoe 37 is mounted adjacent one end for swinging movement coaxially of roller 27. Between arms 39 of shoe 37, roller 27 is received with its adjacent surfaces closely contiguous with complementarily recessed surfaces of shoe 37. In this way, shoe 37 serves to clean from roller 27 substantially all material which roller 27 may pick up from the weld area. But more important than its cleaning function, shoe 37 performs the function of holding stringer bead 9 in place until it has solidified. Accordingly, shoe 37 is provided with an underside 41 complementary to the desired final shape of stringer bead 9 on its exposed side within the joint. Since in the illustrated embodiment the desired outer contour of bead 9 is cylindrical, the underside of shoe 37 is a corresponding fragment of a cylinder of the same radius. Underside 41 is bounded by a pair of longitudinally coextensive elongated oppositely beveled surfaces 43 related angularly to each other the same as beveled edges 7. Surfaces 43 are complementary to edges 7; and since edges 7 in the illustrated embodiment are truncated cones, surfaces 43 are complementary fragments of truncated cones.

Provision is made for urging shoe 37 to swing about its pivotal axis away from the unitary assembly described above and toward the joints so that beveled surfaces 43 throughout their lengths contact substantial lengths of beveled edges 7. Specifically, shoe 37 is provided on its upper side with a recess 45 within which is pivotally mounted at that end a rod 47 which extends upwardly through a radially extending hole through an arm 49 integral with shaft 19 and yoke 25 and extending rearwardly therefrom relative to the welding direction. At its upper end, arm 49 has an enlargement 51 which prevents the rod from returning all the way through the hole through arm 49. A coil compression spring 53 is disposed about rod 47 and acts between arm 49 and an enlarged portion of rod 47 adjacent the pivotal mounting of the lower end thereof so as continuously to urge shoe 37 counterclockwise as seen in Figure 3.

The width of periphery 33 of roller 27 is the same as the width of underside 41 of shoe 37. The lines of contact between beveled surfaces 35 of roller 27 and beveled edges 7 of the pipe sections lie on continuations of the contours of beveled surfaces 43 of shoe 37. It will thus be apparent that as shoe 37 follows along behind roller 27 during the welding operation, the solidifying weld metal initially shaped by roller 27 will be retained in that same shape by shoe 37 until it passes out from beneath the rear end of shoe 37, by which time it has solidified to a self-supporting mass. Accordingly, no special adjustment of shoe 37 is necessary. Shaft 19 may be misaligned from its radial orientation and shoe 37 will automatically adjust to the change because it is swingable about the axis of rotation of roller 27. Roller 27 bears most of the thrust of the unitary assembly while shoe 37 bears only a relatively small portion of this thrust, consistent with the purpose of roller 27 to shape the stringer bead and the purpose of shoe 37 to maintain the shape of the stringer bead.

The operation of the device according to the present invention will be apparent. As is described in the above identified copending application, and as is indicated in Figure 4 of the drawing, the carriage is run down about the pipe sections until it is in its lowermost position and is run up half way about the pipe sections to the top during half the welding operation, the arc being struck and the electrode advancing continuously to supply molten weld metal to the weld area. The parts are then reversed as described in the copending application identified above and run back to the lowermost position and then up and about the other half of the assembly of pipe sections to the top to complete the weld. The adjustment of the parts to operative welding position, the reversal of the parts between formation of the semicircular weld halves and the method of moving the carriage are all described in that above identified application. Of course, when the stringer bead has been completed, the principal welding job may be performed by use of the apparatus of the above identified copending application.

From a consideration of the foregoing, it will be obvious that all of the initially recited objects of the present invention have been achieved.

Although the present invention has been described in connection with preferred embodiments, it is to be understood that modifications and variations may be resorted to without departing from the spirit of this invention, as those skilled in the art will readily understand. Such modifications and variations are considered to be within the purview and scope of the present invention as defined by the appended claims.

What is claimed is:

1. Welding apparatus for forming a stringer bead between contiguous members, comprising a carriage, means mounting the carriage for movement along a joint to be welded between contiguous members, a unitary assembly of an electrode holder and a presser member adapted to contact the stringer bead, means mounting the unitary assembly on the carriage for limited movement relative to the carriage, and means yieldably urging the unitary assembly toward the joint to be welded to position the presser member contiguous to the joint.

2. Welding apparatus for forming a stringer bead between oppositely beveled edges of a pair of contiguous members, comprising a carriage, means mounting the carriage for movement along a joint to be welded between contiguous members, a unitary assembly of an electrode holder and a presser member having oppositely beveled surfaces adapted to bear against oppositely beveled edges of a pair of said contiguous members, means mounting the unitary assembly on the carriage for limited movement relative to the carriage, and means yieldably urging the unitary assembly toward the joint to be welded to position the oppositely beveled surfaces of the presser member against oppositely beveled edges of a pair of said contiguous members.

3. Welding apparatus as claimed in claim 2, the presser member comprising a rotatable roller, said oppositely beveled surfaces of the presser member comprising a pair of truncated conical surfaces on and coaxial with the roller.

4. Welding apparatus for forming a stringer bead between oppositely beveled edges of a pair of contiguous members, comprising a carriage, means mounting the carriage for movement along a joint to be welded between contiguous members, an assembly of an electrode holder and an elongated shoe having elongated oppositely beveled surfaces adapted to bear against a substantial length of oppositely beveled edges of a pair of said contiguous members, means mounting said assembly on the carriage for limited movement relative to the carriage, and means yieldably urging said assembly toward the joint to be welded to position the elongated oppositely beveled surfaces of the shoe against a substantial length of oppositely beveled edges of a pair of said contiguous members.

5. Welding apparatus for forming a stringer bead between oppositely beveled edges of a pair of contiguous members, comprising a carriage, means mounting the carriage for movement along a joint to be welded between contiguous members, a unitary assembly of an electrode holder and a presser member adapted to bear against at least one of a pair of said contiguous members, an elongated shoe having elongated oppositely beveled surfaces adapted to bear against a substantial length of oppositely beveled edges of a pair of said contiguous members, means mounting the shoe on the unitary assembly for limited movement relative to the unitary assembly, means yieldably urging the shoe away from the unitary assembly and toward the joint to be welded to position the elongated oppositely beveled surfaces of the shoe against a substantial length of oppositely beveled edges of a pair of said contiguous members, means mounting the unitary assembly on the carriage for limited movement relative to the carriage, and means yieldably urging the unitary assembly toward the joint to be welded to position the presser member against at least one of a pair of said contiguous members.

6. Welding apparatus as claimed in claim 5, said means mounting the shoe on the unitary assembly comprising means providing a pivotal connection between the unitary assembly and one end of the shoe.

7. Welding apparatus for forming a stringer bead between oppositely beveled edges of a pair of contiguous members, comprising a carriage, means mounting the carriage for movement along a joint to be welded between contiguous members, a unitary assembly of an electrode holder and a rotatable roller having a pair of oppositely disposed truncated conical surfaces on and coaxial with the roller and adapted to bear against oppositely beveled edges of a pair of said contiguous members, an elongated shoe pivotally mounted adjacent one end on the unitary assembly for swinging movement coaxially of the roller, the shoe having elongated oppositely beveled surfaces adapted to bear against a substantial length of oppositely beveled edges of a pair of said contiguous members, means yieldably urging the shoe away from the unitary assembly and toward the joint to be welded to position the elongated oppositely beveled surfaces of the shoe against a substantial length of oppositely beveled edges of a pair of said contiguous members, means mounting the unitary assembly on the carriage for limited movement relative to the carriage, and means yieldably urging the unitary assembly toward the joint to be welded to position the truncated conical surfaces of the roller against oppositely beveled edges of a pair of said contiguous members.

8. In welding apparatus for forming a stringer bead between oppositely beveled edges of a pair of contiguous members and including a carriage and means mounting the carriage for movement along a joint to be welded between contiguous members, the improvement comprising a presser member having oppositely beveled surfaces adapted to bear against oppositely beveled edges of a pair of said contiguous members, means mounting the presser member on the carriage for limited movement relative to the carriage, means yieldably urging the presser member toward the joint to be welded to position the oppositely beveled surfaces of the presser member against oppositely beveled edges of a pair of said contiguous members, an elongated shoe having elongated oppositely beveled surfaces adapted to bear against a substantial length of oppositely beveled edges of a pair of said contiguous members, the shoe being swingably mounted adjacent one end on said means mounting the presser member on the carriage, and means yieldably urging the shoe to swing relative to the presser member to position the elongated oppositely beveled surfaces of the shoe against a substantial length of oppositely beveled edges of a pair of said contiguous members.

9. The structure claimed in claim 8, the presser member comprising a rotatable roller, said oppositely beveled surfaces of the presser member comprising a pair of truncated conical surfaces on and coaxial with the roller, and the axis of swinging movement of the shoe being coincident with the axis of the roller.

References Cited in the file of this patent

UNITED STATES PATENTS

| | | |
|---|---|---|
| 2,403,221 | Howard | July 1, 1946 |
| 2,441,551 | Anderson | May 18, 1948 |
| 2,677,036 | Meyer et al. | Apr. 27, 1954 |